Aug. 1, 1933.  E. W. LYEN  1,920,514
RECORDING SPEED INDICATOR
Original Filed July 5, 1928  2 Sheets-Sheet 1
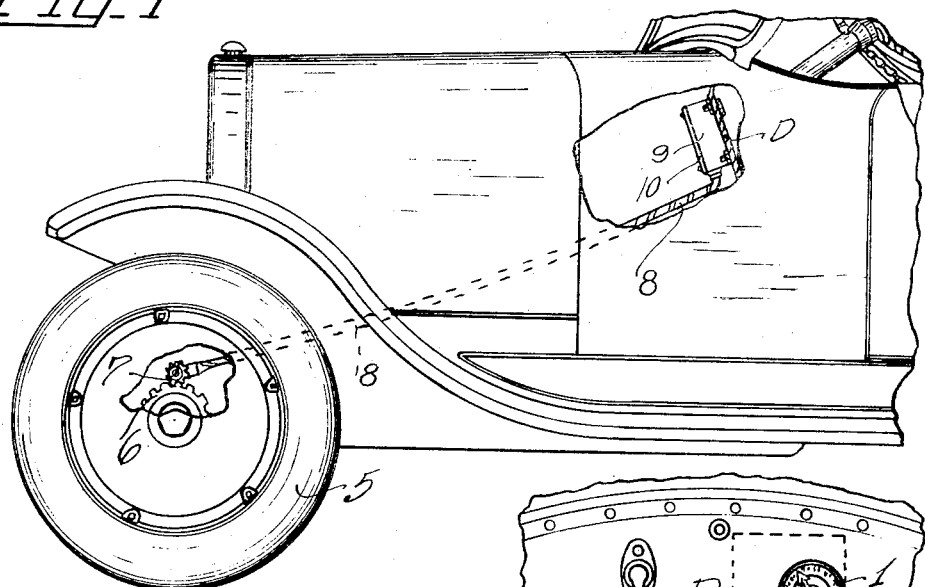
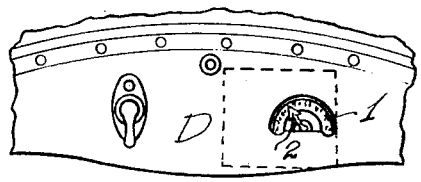
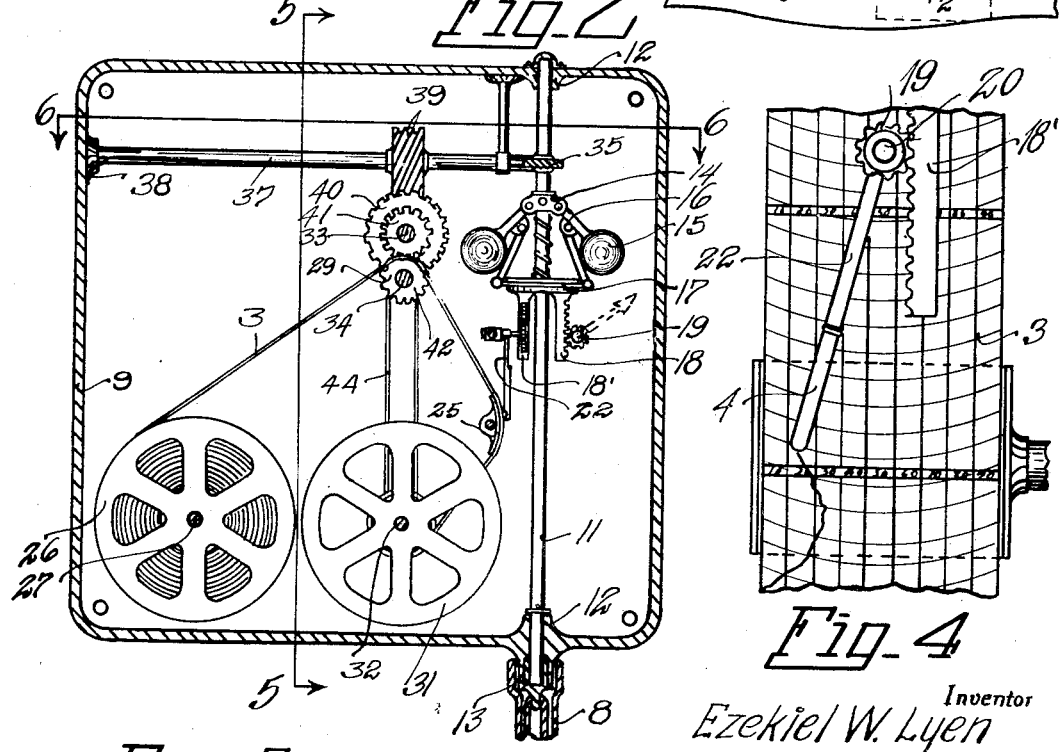
Inventor
Ezekiel W. Lyen
By Herbert E. Smith
Attorney

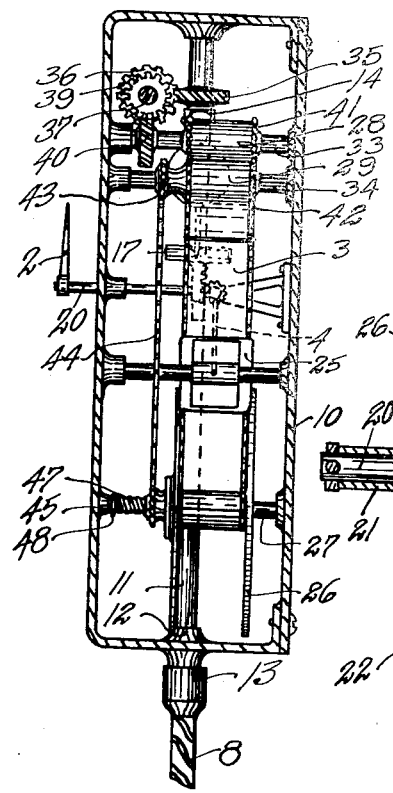
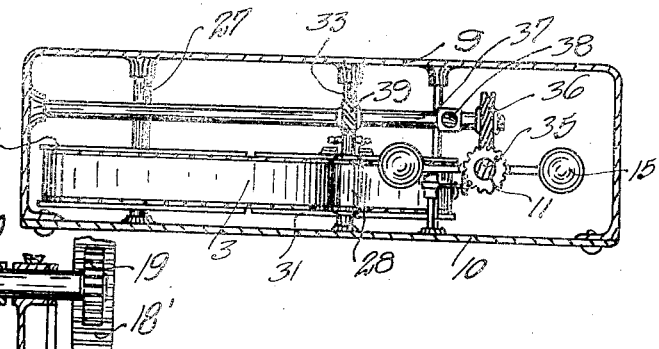
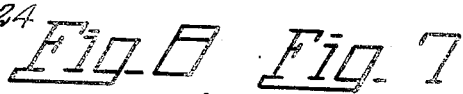
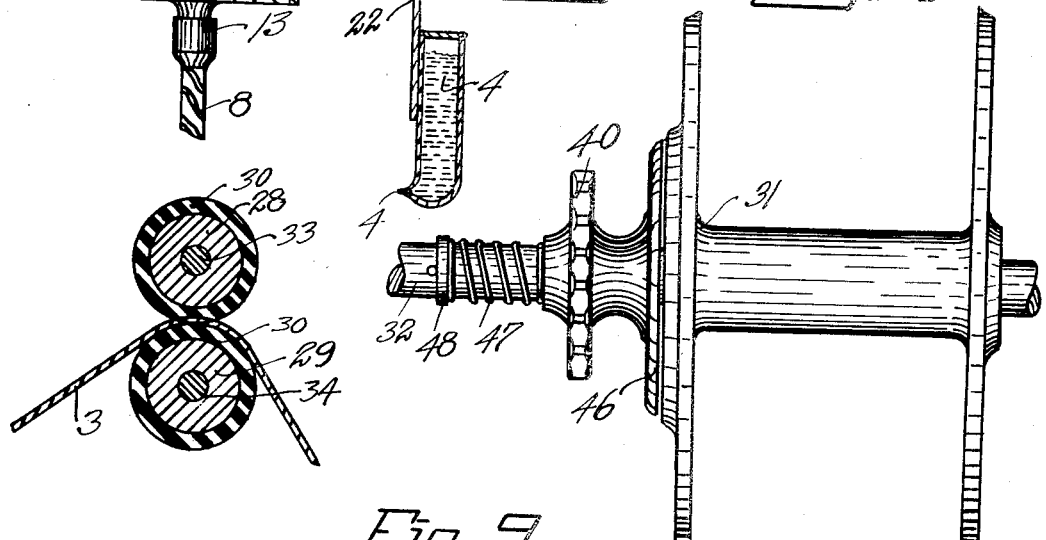

Patented Aug. 1, 1933

1,920,514

UNITED STATES PATENT OFFICE 1,920,514

RECORDING SPEED INDICATOR

Ezekiel W. Lyen, Yakima, Wash.

Application July 5, 1928, Serial No. 290,318
Renewed January 7, 1933

1 Claim. (Cl. 234—1)

My present invention relates to an improved recording speed indicator which while adapted for use on various kinds of motor vehicles, is particularly designed for use on automobiles for the purpose of indicating and recording the speed of the automobile. The device of my invention contemplates the use of an instrument operated as usual from one of the revolving wheels of the automobile, and the indicating device and recorder are preferably located upon the dashboard or instrument board where they are readily accessible and where they may be observed by the driver of the automobile. In carrying out my invention, I utilize a pointer for indicating the speed of the automobile, and for recording the speed of the automobile I employ in connection with a moving paper strip or tape, a fountain pen which writes the graph upon the face of the strip to form the chart that records the variation in speed of the automobile.

My invention consists in certain novel combinations and arrangements of parts as will hereinafter be more fully set forth and claimed.

In the accompanying drawings, I have illustrated one complete example of the physical embodiment of my invention wherein the parts are combined and arranged according to the best mode I have so far devised for the practical application of the principles of my invention.

Figure 1 is a side view at the front portion of an automobile showing parts broken away to illustrate the location and assembly of the instrument of my invention;

Fig. 2 is a plan view showing a portion of the instrument board of the automobile and the indicator thereon;

Fig. 3 is a vertical sectional view through the box or casing in which the operating parts of the instrument are located;

Fig. 4 is a plan view of a portion of the recording tape or paper strip showing the pen and the graph which is drawn by the pen;

Fig. 5 is a sectional view at line 5—5 of Fig. 3;

Fig. 6 is a sectional view at line 6—6 of Fig. 3;

Fig. 7 is an enlarged detail view of the winding reel showing its slip clutch;

Fig. 8 is a sectional detail view of the pen and its operating parts; and

Fig. 9 is a sectional detail view of the feed rolls for the paper strip.

The indicator includes a dial 1 and a needle or pointer 2 that are supported upon the instrument board or dashboard D as shown in Fig. 2, where the pointer is visible to the driver and in connection with the dial 1 indicates the speed at which the automobile is traveling.

For recording the speed of the automobile, I use a tape or paper strip 3 which as shown in Fig. 4, may be ruled and provided with suitable marks to form a chart in connection with the graph line that is drawn by the fountain pen 4 as the paper strip is fed past the fountain pen.

The operating parts of the instrument are actuated as usual from one of the revolving wheels 5 of the automobile through a pinion 6 and bevel gear 7, the latter on the flexible shaft 8 that extends upwardly and rearwardly to the underside of the instrument board or dashboard.

The operating parts of the instrument are enclosed in a box 9 that is secured to the instrument board and is provided with a removable plate 10 which permits access to the interior of the box.

An operating shaft 11 is journaled at 12 in the box and is operatively connected to the flexible shaft 8 at 13 so that the movement of the flexible shaft is transmitted to the operating shaft within the box.

The operating shaft is provided with a governor of the centrifugal type which includes a head 14, balls 15, linkage 16, and the slide collar 17. This slide collar is fashioned with a rack bar 18 and this rack bar meshes with a pinion 19 for operating the indicator arrow or needle 2.

The slide collar 7 is provided with a second rack bar 18' for operating the pen 4 through the instrumentality of a pinion 19 on the pen shaft 20. This pen shaft 20 is journaled to rock in bearings 21 within the box and the pen is provided with a flexible arm 22 having a collar fixed on the rock shaft 20. By means of a spring blade 23 and the adjusting screw 24, the pressure of the fountain pen 4 against the strip or paper 3 may be adjusted so that the graph or line may correctly be imprinted on the strip. Adjacent the fountain pen, the paper strip passes over a guide table 25 and this table supports the portion of the paper strip upon which the graph is being imprinted by the fountain pen.

The rolled blank or paper strip is carried on an unwinding roll 26 which is carried upon a shaft 27 journaled in the side walls of the box, and the strip 3 passes upwardly and between a pair of feed rollers 28 and 29, each of which has a gripping face as 30 preferably fashioned of rubber. The paper strip is thus retained between these resilient faces of the feed rolls, and the feed rolls pass the paper strip to a winding reel 31 that is carried by the shaft 32, the shaft 32 being journaled in the side walls of the box.

The feed rolls 28 and 29 are provided with shafts 33 and 34 that are suitably journaled within the box and these shafts are driven from the operating shaft 11 by a worm gear 35 on the operating shaft 11. This worm gear 35 meshes with a gear 36 on the gear shaft 37 and the latter is journaled in horizontal position in bearings 38 near the upper part of the box. A spiral gear 39 on the shaft 37 meshes with a complementary gear 40 on the shaft 33 and another gear 41 on shaft 33 drives the gear 42 on shaft 34. By this means, the feed rolls are operated to continuously feed the paper strip to the winding reel. The winding reel is also revolved from the shaft 34 by means of a sprocket 43, chain 44, and sprocket 45 on the winding shaft 32.

In transmitting the power to the winding reel, I employ a slip clutch for the purpose of avoiding breakage between the operating parts, should the winding reel for any reason stop revolving, as for instance when the paper strip 3 is wound entirely upon the winding reel. The sprocket wheel 40 is fashioned with a rigidly connected friction disk 46 that engages the face of the winding reel, and a spring 47 on the reel shaft or winding shaft 32 presses the friction disk 46 against the face of the winding reel. The spring is interposed between the sprocket wheel 40 and a collar 48 that is fixed to the shaft 32, and it will be apparent that the spring pressed clutch member will frictionally engage the winding reel for the purpose of winding the paper strip thereon. When the paper strip is entirely wound upon the winding reel, the instrument may be disconnected from operation, or should the friction disk continue to revolve while the reel is stationary, the slip clutch will permit the relative movement of the sprocket 40 and its friction disk.

In the above described manner, the pointer or indicator 2 is operated to afford a visible means of indicating the speed at which the automobile is traveling, and the record of the variation in speeds is preserved upon the record strip or paper strip 3 by means of the graph line imprinted on the strip by the fountain pen 4.

Having thus fully described my invention, what I claim as new and desire to secure by Letters Patent is—

A mounting for a fountain pen adapted to bear on a moving tape, consisting of a flexible arm fixedly secured to a rockable shaft and carrying a fountain pen; a blade secured to the same shaft and disposed in the same direction as the arm; a screw adjustably secured to said blade and disposed to engage the flexible arm at a point well removed from its point of support in a manner to bend the flexible arm and maintain it in proper contact with a moving tape.

EZEKIEL W. LYEN.